United States Patent
Kasai et al.

(10) Patent No.: US 11,312,661 B2
(45) Date of Patent: Apr. 26, 2022

(54) HONEYCOMB STRUCTURE

(71) Applicant: NGK INSULATORS, LTD., Nagoya (JP)

(72) Inventors: Yoshiyuki Kasai, Nagoya (JP); Yukinari Shibagaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 265 days.

(21) Appl. No.: 16/298,282

(22) Filed: Mar. 11, 2019

(65) Prior Publication Data

US 2019/0300446 A1    Oct. 3, 2019

(30) Foreign Application Priority Data

Mar. 29, 2018 (JP) .............................. JP2018-065741

(51) Int. Cl.
*B01D 46/24* (2006.01)
*C04B 38/00* (2006.01)
(Continued)

(52) U.S. Cl.
CPC ...... *C04B 38/0009* (2013.01); *B01D 39/2068* (2013.01); *B01D 46/0063* (2013.01);
(Continued)

(58) Field of Classification Search
None
See application file for complete search history.

(56) References Cited

U.S. PATENT DOCUMENTS

| | | | |
|---|---|---|---|
| 5,259,190 A | * | 11/1993 | Bagley ............... B01D 46/0063 60/300 |
| 2004/0141890 A1 | * | 7/2004 | Hirata ................... B01D 46/50 422/186.04 |

(Continued)

FOREIGN PATENT DOCUMENTS

| CN | 105645961 A | * | 6/2016 |
|---|---|---|---|
| JP | S58-143817 A1 | | 8/1983 |

(Continued)

OTHER PUBLICATIONS

Chen et al., machine translation of CN105645961 Abstract and Description, Jun. 8, 2016 (Year: 2016).*

(Continued)

*Primary Examiner* — Mary I Omori
(74) *Attorney, Agent, or Firm* — Burr & Brown, PLLC

(57) ABSTRACT

A honeycomb structure including a honeycomb portion having porous partition walls extending from an inflow end face to an outflow end face, an outermost peripheral wall, and a pair of electrode layers on a side surface of the honeycomb portion. Each electrode layer extends in a direction of the cells. One electrode layer is disposed on a side opposite to the other electrode layer across a center of the honeycomb portion in a cross section orthogonal to the extending direction of the cells. The honeycomb structure portion includes first cells opened on the inflow side and plugged on the outflow side, and second cells opened on the outflow side and plugged on the inflow side. A middle of each length of the pair of electrode layers is closer to the outflow side than a middle position of a length of the honeycomb portion in the extending direction of the cells.

3 Claims, 7 Drawing Sheets

(51) Int. Cl.
    *B01D 39/20*     (2006.01)
    *B01D 46/00*     (2022.01)
    *C04B 35/565*     (2006.01)

(52) U.S. Cl.
    CPC ..... *B01D 46/2418* (2013.01); *B01D 46/2429* (2013.01); *B01D 46/2474* (2013.01); *C04B 35/565* (2013.01); *B01D 46/2486* (2021.08); *B01D 46/24491* (2021.08)

(56) References Cited

U.S. PATENT DOCUMENTS

| | | | | |
|---|---|---|---|---|
| 2009/0315569 | A1* | 12/2009 | Katsuyama | F01N 9/002 324/649 |
| 2013/0224080 | A1* | 8/2013 | Ishihara | H05B 3/06 422/174 |
| 2013/0284719 | A1* | 10/2013 | Kasai | B01J 35/04 219/541 |
| 2014/0010720 | A1* | 1/2014 | Kasai | F01N 3/2828 422/174 |

FOREIGN PATENT DOCUMENTS

| | | | |
|---|---|---|---|
| JP | 2000-297625 | A1 | 10/2000 |
| JP | 2005-194935 | A | 7/2005 |
| JP | 2013-198887 | A | 10/2013 |
| WO | 2012/086813 | A1 | 6/2012 |

OTHER PUBLICATIONS

Japanese Office Action (with English translation), Japanese Application No. 2018-065741, dated Sep. 7, 2021 (6 pages).

\* cited by examiner

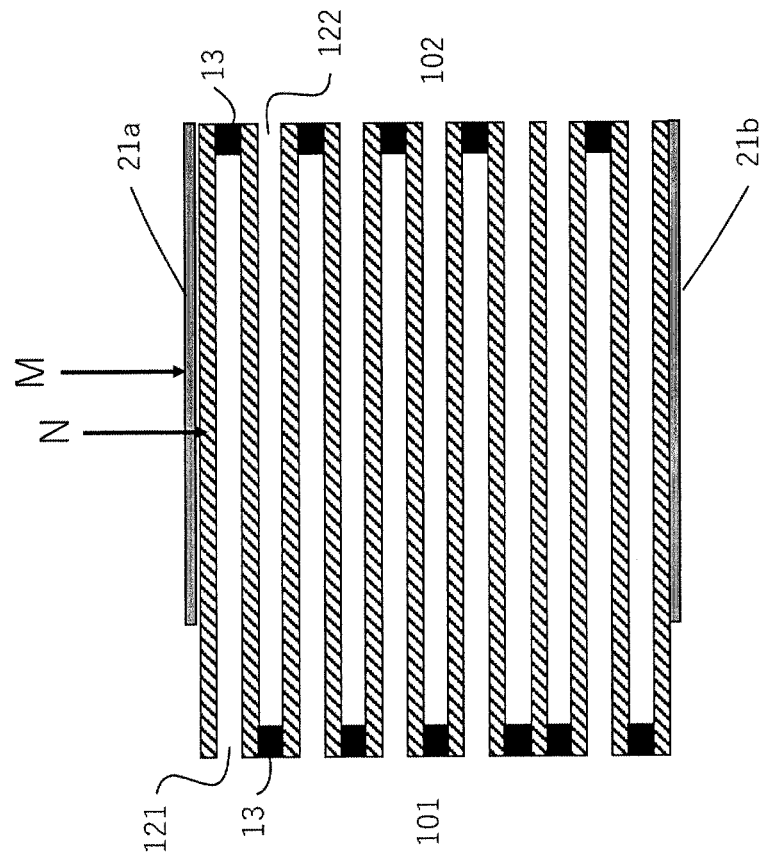
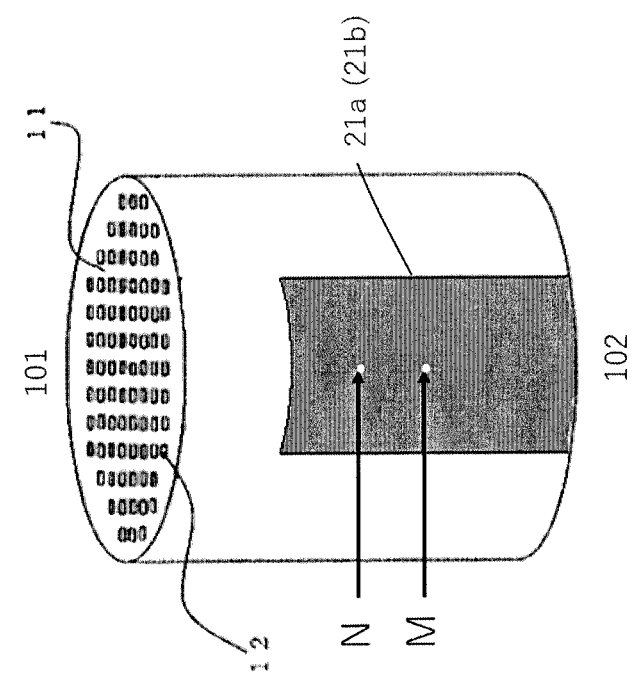
Fig.5(B)
Fig.5(A)

HONEYCOMB STRUCTURE

This application claims the benefit under 35 USC § 119(a)-(d) of Japanese Application No. 2018-065741 filed Mar. 29, 2018, the entirety of which is incorporated herein by reference.

FIELD OF THE INVENTION

The present invention relates to a honeycomb structure. More particularly, it relates to a honeycomb structure capable of effectively suppressing generation of cracks in a honeycomb structure due to combustion of particulates during electrical heating.

BACKGROUND OF THE INVENTION

Ceramic honeycomb structure filters are known for reducing particulates contained in motor vehicle exhaust gases. Further, a technique has been proposed in which a ceramic honeycomb filter itself is regarded as an electrical heating element, and particulates are burned off by electrical heating.

Patent Document 1 discloses a filter device for removing flammable particulates, the filter comprising a wall structure that forms a plurality of paths each extending from an inlet side to an outlet side, the paths being comprised of an inlet path group with an outlet side of the path closed by an outlet closing wall and an outlet path group with an inlet side closed by an inlet closing wall, any one of the inlet paths sharing the wall with at least one outlet path to capture flammable particulates, wherein at least the wall structure is formed of a porous conductive ceramic, and wherein an outer peripheral portion of the filter comprises a voltage applying means for electrically heating the wall structure.

Further, Patent Document 2 discloses a self-heating type diesel particulate filter, in which electrode layers are formed on both end faces of a filter body made of porous conductive ceramics, excluding a center portion of each end face, so that burned residues of particulates is reduced, thereby providing a higher regeneration rate. It also discloses that after regeneration, there is no abnormality such as cracking, and the DPF has high safety.

CITATION LIST

Patent Literatures

Patent Document 1: Japanese Patent Application Publication No. S58-143817 A
Patent Document 2: Japanese Patent Application Publication No. 2000-297625 A

SUMMARY OF THE INVENTION

When burning and removing particulates deposited in a honeycomb structure by electrically heating the honeycomb structure as a filter, combustion of the particulates on an inlet side of the honeycomb structure transmits combustion heat to a downstream side, so that a larger temperature difference is generated in a length direction of the honeycomb structure portion in conjunction with the combustion of the particulates on the downstream side, and cracks may be generated due to thermal stress. Further, when the material of the honeycomb structure portion has NTC characteristic, a current easily flows to a higher temperature side, so that a larger temperature difference in the honeycomb structure portion is further increased.

It should be noted that the NTC characteristic (Negative Temperature Coefficient) is a characteristic indicating a decrease in resistance with temperature rise.

The present invention has been made in view of the above problems. An object of the present invention is to provide a honeycomb structure capable of effectively suppressing generation of cracks in the honeycomb structure due to combustion of particulates during electrical heating.

As a result of intensive studies, the present inventors have found that the above problems can be solved by disposing a center position in a longitudinal direction of each electrode layer disposed on a side surface of the honeycomb structure, on a more downstream side than the longitudinal center position of the honeycomb structure, whereby a temperature difference during particulate combustion in the honeycomb structure can be suppressed. Thus, the present invention is specified as follows:

(1) A honeycomb structure, comprising:
a pillar shaped honeycomb structure portion having:
porous partition walls extending through the pillar shaped honeycomb structure portion from an inflow end face to an outflow end face to define a plurality of cells forming a through channel;
an outer peripheral wall located at the outermost periphery;
a pair of electrode layers disposed on a side surface of the honeycomb structure portion;
wherein each of the pair of electrode layers is formed in a strip shape extending in an extending direction of the cell of the honeycomb structure portion;
wherein one electrode layer of the pair of electrode layers is disposed on a side opposite to the other electrode layer across a center of the honeycomb structure portion in a cross section orthogonal to the extending direction of the cell;
wherein the honeycomb structure portion comprises:
a plurality of first cells, the first cells being opened on the inflow side of the fluid and having plugged portions on the end face on the outflow side of the fluid; and
a plurality of second cells, the second cells being opened on the outflow side of the fluid and having plugged portion on the end face on the inflow side of the fluid; and
wherein a middle position of each length of the pair of electrode layers is closer to the outflow end face than a middle position of a length of the honeycomb structure portion in the extending direction of the cells.

(2) The honeycomb structure according to (1), wherein the honeycomb structure portion is formed of a ceramic material.

(3) The honeycomb structure according to (1) or (2), wherein a material of the honeycomb structure portion has NTC characteristic.

(4) The honeycomb structure according to any one of (1) to (3), wherein each of the pair of electrode layers has a length of less than 0.9×L in the extending direction of the cell of the honeycomb structure portion from the end face on the outflow side of the fluid, in which L is a length of the honeycomb structure portion in the extending direction of the cell.

According to the present invention, it is possible to suppress effectively generation of cracks in the honeycomb structure due to particulate combustion during electrical heating, and also facilitate electrical control, so that particulates can be efficiently burned and removed.

BRIEF DESCRIPTION OF THE DRAWINGS

FIGS. 5(A) and 5(B) are views showing arrangement of electrode layers in an embodiment of the present invention.

DETAILED DESCRIPTION OF THE INVENTION

Hereinafter, embodiments of a support for an electrically heating type catalyst according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure Portion)

Figure 1:
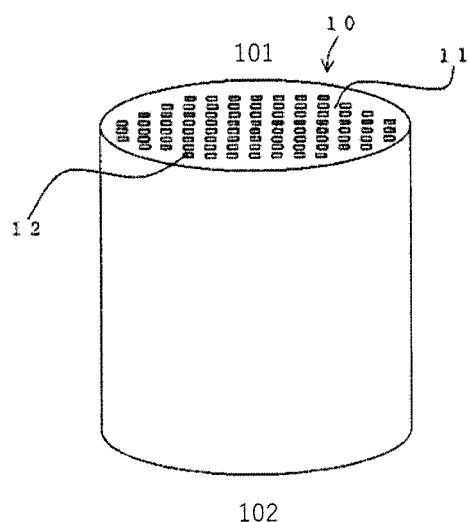
FIG. 1 is a view showing an example of a honeycomb structure portion in the present invention.

FIG. 1 is a view showing an example of a honeycomb structure portion in the present invention. For example, a honeycomb structure portion 10 includes: porous partition walls 11 extending through the honeycomb structure portion 10 from an inflow end face 101 to an outflow end face 102 to define a plurality of cells 12 forming a through channel and an outer peripheral wall located at the outermost periphery. The number, arrangement, shape and the like of the cells 12, as well as the thickness of each partition wall 11, and the like, are not limited and may be optionally designed as required.

A material of the honeycomb structure 10 is not particularly limited as long as it has conductivity, and metals, ceramics and the like may be used. In particular, from the viewpoint of compatibility of heat resistance and conductivity, preferably, the material of the honeycomb structure portion 10 is mainly based on a silicon-silicon carbide composite material or silicon carbide, and more preferably, it is a silicon-silicon carbide composite material or silicon carbide. Tantalum silicide ($TaSi_2$) and chromium silicide ($CrSi_2$) may also be added to lower the electric resistivity of the honeycomb structure. The phrase "the honeycomb structure portion 10 is mainly based on a silicon-silicon carbide composite" means that the honeycomb structure portion 10 contains 90% by mass or more of the silicon-silicon carbide composite material (total mass) based on the entire honeycomb structure portion. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure portion 10 is mainly based on silicon carbide" means that the honeycomb structure portion 10 contains 90% by mass or more of silicon carbide (total mass) based on the entire honeycomb structure portion.

Further, a material of the honeycomb structure portion 10 preferably has NTC characteristic. When the material of the honeycomb structure portion 10 has the NTC characteristic, a current easily flows toward a higher temperature side, and in prior art, a larger temperature difference in the honeycomb structure portion is further increased, so that the NTC characteristic remarkably produces the effect of the present invention. Further, when the material of the honeycomb structure portion 10 has the NTC characteristic, particulates are easily burned out on the downstream side where the particulates such as soot tend to be deposited.

The electric resistivity of the honeycomb structure portion 10 may be set as needed depending on voltage to be applied, including, but not particularly limited to, from 0.001 to 200 Ω·cm, for example. For a higher voltage of 64 V or more, it may be from 2 to 200 Ω·cm, and typically from 5 to 100 Ω·cm. Further, for a lower voltage of less than 64 V, it may be from 0.001 to 2 Ω·cm, and typically from 0.001 to 1 Ω·cm, and more typically from 0.01 to 1 Ω·Cm.

Each partition wall 11 of the honeycomb structure portion 10 preferably has a porosity of from 35 to 60%, and more preferably from 35 to 45%. The porosity of less than 35% may result in larger deformation during firing. The porosity of more than 60% may result in decreased strength of the honeycomb structure portion. The porosity is a value measured by a mercury porosimeter.

Each partition wall 11 of the honeycomb structure portion 10 preferably has an average pore size of from 2 to 15 μm, and more preferably from 4 to 8 μm. The average pore diameter of less than 2 μm may result in excessively higher electric resistivity. The average pore diameter of more than 15 μm may result in excessively lower electric resistivity. The average pore size is a value measured by a mercury porosimeter.

The shape of each cell 12 in a cross section of each cell orthogonal to a flow path direction is not limited, but it may preferably be a square, a hexagon, an octagon, or a combination thereof. Among these, the square and hexagonal shapes are preferable. Such a cell shape leads to a decreased pressure loss when an exhaust gas flows through the honeycomb structure portion 10, and improved purification performance of the catalyst.

Figure 2:
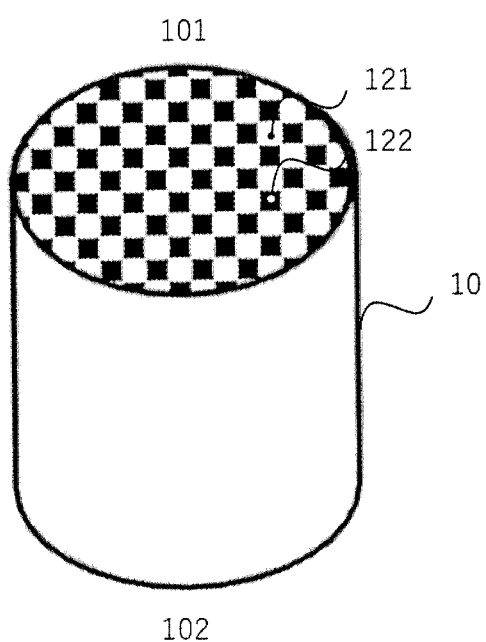
FIG. 2 is a view showing first cells and second cells in an embodiment of the present invention.
Figure 3:
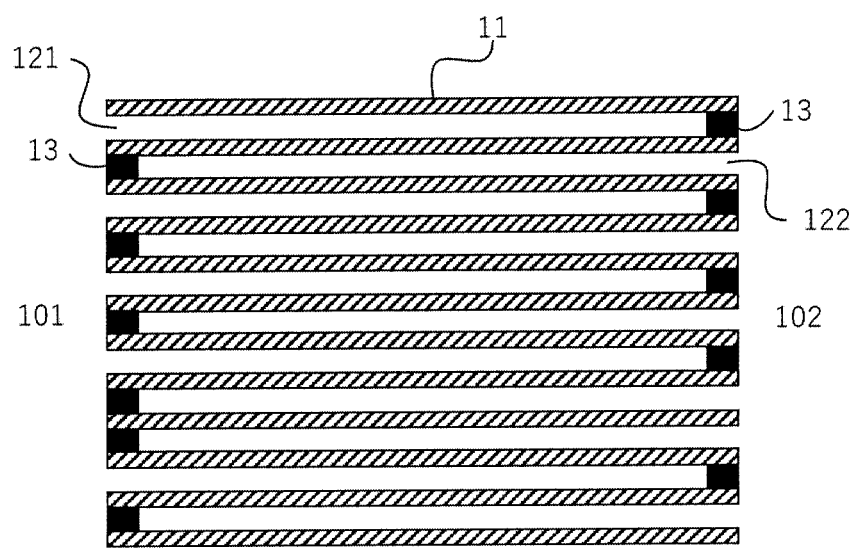
FIG. 3 is a view showing a cross section parallel to an extending direction of a cell 12 of a honeycomb structure portion 10 in FIG. 2.

As shown in FIG. 2 and FIG. 3, in this embodiment, the honeycomb structure portion includes: a plurality of first cells 121, the first cells 121 being opened on an inflow side of a fluid and having plugged portions 13 on an end face 102 on an outflow side of the fluid; and a plurality of second cells 122, the second cells 122 being opened on the outflow side of the fluid and having plugged portions 13 on an end face 101 on the inflow side of the fluid. The plurality of first cells and the plurality of second cells are alternately arranged so as to be adjacent to each other across each partition wall 11. As a result, the fluid passes through the honeycomb structure portion 10 through the partition walls 11. In the honeycomb structure portion according to the embodiment shown, all the first cells are adjacent to the second cells, and all the second cells are adjacent to the first cells. However, all the first cells may not be necessarily adjacent to the second cells, and all the second cells may not be necessarily adjacent to the first cells.

The outer shape of the honeycomb structure portion 10 is not particularly limited as long as it presents a pillar shape, and it may be, for example, a shape such as a pillar shape with circular bottoms (cylindrical shape), a pillar shape with oval shaped bottoms, and a pillar shape with polygonal (square, pentagonal, hexagonal, heptagonal, octagonal, and the like) bottoms, and the like. Further, for the size of the honeycomb structure portion 10, the honeycomb structure portion preferably has an area of bottom surfaces of from 2000 to 22000 mm$^2$, and more preferably from 4000 to 15000 mm$^2$, in terms of increasing heat resistance (preventing cracks generated in a circumferential direction of the outer peripheral side wall). Further, an axial length of the honeycomb structure portion 10 is preferably from 50 to 200 mm, and more preferably from 75 to 150 mm, in terms of increasing the heat resistance (preventing cracks generated in a direction parallel to a central axis direction on the outer peripheral side wall).

Further, the honeycomb structure portion 10 can be used as a catalyst support by supporting a catalyst on the honeycomb structure portion 10.

Production of the honeycomb structure portion can be carried out in accordance with a method for making a honeycomb structure portion in a known method for producing a honeycomb structure portion. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 µm, and more preferably from 3 to 40 µm. The average particle diameter of the metallic silicon particles in the metallic silicon powder is preferably from 2 to 35 µm. The average particle diameter of each of the silicon carbide particles and the metallic silicon particles refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 µm. If it is less than 10 µm, pores may not be sufficiently formed. If it is more than 30 µm, a die may be clogged with the pore former during forming. The average particle size of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure portion. In extrusion molding, a die having a desired overall shape, cell shape, partition wall thickness, cell density and the like can be used. Preferably, the resulting honeycomb structure portion is dried. When the length in the central axis direction of the honeycomb structure portion is not the desired length, both the end faces of the honeycomb structure portion can be cut to the desired length.

The honeycomb dried body is then fired to prepare a honeycomb fired body. Before firing, calcination may preferably be carried out in order to remove the binder and the like. The calcination is preferably performed in an air atmosphere at a temperature of from 400 to 500° C. for 0.5 to 20 hours. The methods of calcination and firing are not limited, and they may be carried out using an electric furnace, a gas furnace or the like. The firing can be preferably carried out in an inert atmosphere such as nitrogen and argon at a temperature of from 1400 to 1500° C. for 1 to 20 hours. After firing, an oxygenation treatment is preferably carried out at a temperature of from 1200 to 1350° C. for 1 to 10 hours in order to improve durability.

(2. Electrode Layer)

Figure 4A:
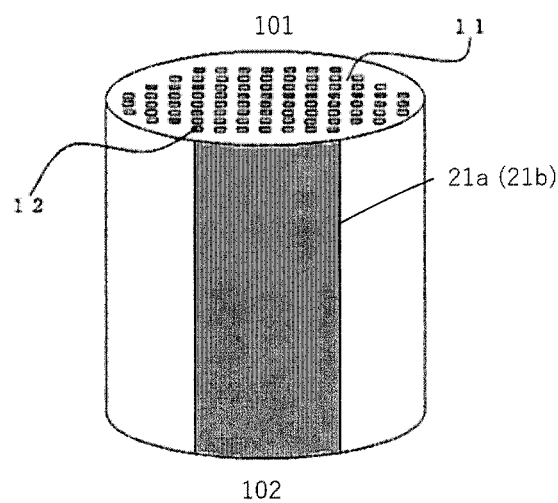
FIG. 4(A) is a view showing arrangement of electrode layers in prior art.
Figure 4B:
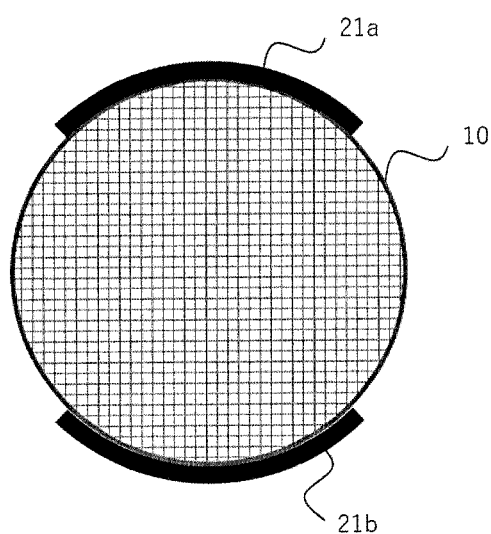
FIG. 4(B) is a view showing a cross section in a direction orthogonal to an extending direction of a cell 12 of the honeycomb structure portion in FIG. 4(A).

As shown in FIGS. 4(*a*) and 4(*b*), in general, the outer peripheral wall of the honeycomb structure portion is provided with a pair of electrode layers 21*a*, 21*b*. Each of the electrode layers 21*a*, 21*b* is formed in a strip shape extending in the extending direction of the cell 12 of the honeycomb structure portion. In a cross section of the honeycomb structure portion orthogonal to the extending direction of the cell 12, the pair of electrode layers 21*a*, 21*b* are arranged so as to face each other across a center of the honeycomb structure portion. Such a configuration allows suppression of any bias of a current flowing in the honeycomb structure portion 10 and suppression of any bias of a temperature distribution in the honeycomb structure portion, when a voltage is applied.

However, when the electrode layers 21*a*, 21*b* are provided over the full length of the honeycomb structure portion in the extending direction of the cell 12 of the honeycomb structure portion, upon burning and removing of particulates deposited in the honeycomb structure by electrically heating the honeycomb structure as a filter, combustion of the particulates on an inlet side of the honeycomb structure portion transmits combustion heat to a downstream side, so that a larger temperature difference is generated in a length direction of the honeycomb structure portion in conjunction with the combustion of the particulates on the downstream side, and cracks may be generated due to thermal stress, as stated above. Further, when the material of the honeycomb structure portion has the NTC characteristic, a current easily flows toward a higher temperature side, so that the larger temperature difference in the honeycomb structure portion is further increased.

Therefore, as shown in FIGS. 5(a) and 5(b), in the honeycomb structure of this embodiment, a central position M of each length of the pair of electrode layers 21a, 21b is closer to the end face 102 on the outflow side of the fluid than a central position N of a length of the honeycomb structure portion 10, in the extending direction of the cell 12.

In the embodiment shown in FIGS. 5(a) and 5(b), the lengths of the pair of electrode layers 21a, 2 b are constant in the extending direction of the cell 12. However, if the lengths are not constant, the length of each of the electrode layers 21a, 21b is defined as the longest length of lengths for which straight lines each parallel to the extending direction of the cell 12 pass through the electrode layers 21a, 21b, and M is defined as a central position thereof. The same is true for the honeycomb structure portion 10.

In the embodiment shown in FIGS. 5(a) and 5(b), the electrode layers 21a, 21b have the same length. However, it is sufficient as long as the center position M of each length is closer to the end face 102 on the outflow side of the fluid than the center position N of the length of the honeycomb structure portion 10, and the electrode layers 21a, 21b are not required to have the same length. However, it is preferable that the electrode layers 21a, 21b have the same length.

When the length of the honeycomb structure 10 in the extending direction of the cell 12 is defined as L, each of the electrode layers 21a, 21b has a length of less than 0.9×L in the extending direction of the cell 12 of the honeycomb structure 10 from the end face 102 on the outflow side of the fluid. The extending range of each of the electrode layers 21a, 21b within the length of 0.9×L can more remarkably produce the effect of the present invention. Although a lower limit of the extending range of each of the electrode layers 21a, 21b is not particularly specified, it is preferably a length of 0.3×L or more, in terms of achieving the original functions of the electrode layers 21a, 21b.

With such arrangement of the electrode layers, the downstream side is more heated than the upstream side by electrical heating, and the particulates on the downstream side are burned. The heat on the downstream side is transmitted to the upstream side, whereby the particulates on the upstream side are burned. This can lead to a decreased temperature difference in the length direction of the honeycomb structure portion 10 due to the particulate combustion during the electrical heating and suppression of generation of cracks, and also facilitate electrical control, thereby enabling the particulates to be efficiently burned and removed.

The electrode layers 21a, 21b are formed of a material having conductivity. It is preferable that each of electrode layers 21a, 21b is mainly based on silicon carbide particles and silicon, and it is more preferable that each of the electrode layers 21a, 21b is formed using silicon carbide particles and silicon as raw materials except for impurities that are usually contained. As used herein, the phrase "mainly based on silicon carbide particles and silicon" means that the total mass of silicon carbide particles and silicon is 90% by mass or more of the mass of the entire electrode portion. Thus, each of the electrode layers 21a, 21b is mainly based on silicon carbide particles and silicon, whereby components of each of the electrode layers 21a, 21b and components of the honeycomb structure portion 10 are the same as or close to each other (which is a case where the material of the honeycomb structure is silicon carbide). Therefore, thermal expansion coefficient values of the electrode layers 21a, 21b and the honeycomb structure will be the same as or close to each other. Further, since the materials are the same as or close to each other, a bonding strength between the electrode layers 21a, 21b and the honeycomb structure portion 10 is also increased. Therefore, even if thermal stress is applied to the honeycomb structure, it is possible to prevent the electrode layers 21a, 21b from peeling off from the honeycomb structure portion 10 or joint portions between the electrode layers 21a, 21b and the honeycomb structure 10 from being broken.

Further, in the cross section orthogonal to the extending direction of the cell 12, a central angle α of each of the electrode layers 21a, 21b is preferably from 45 to 140°. Furthermore, the central angle α of one of the electrode layers 21a, 21b is preferably from 0.8 to 1.2 times larger than the central angle α of the other of the electrode layers 21a, 21b, and more preferably 1.0 times (the same size). This can allow suppression of any bias of the current flowing through each of the outer periphery and the central region of the honeycomb structure portion when a voltage is applied between the pair of electrode layers 21a, 21b. In each of the outer periphery and the central region of the honeycomb structure portion, any bias of heat generation can be suppressed.

Figure 6:
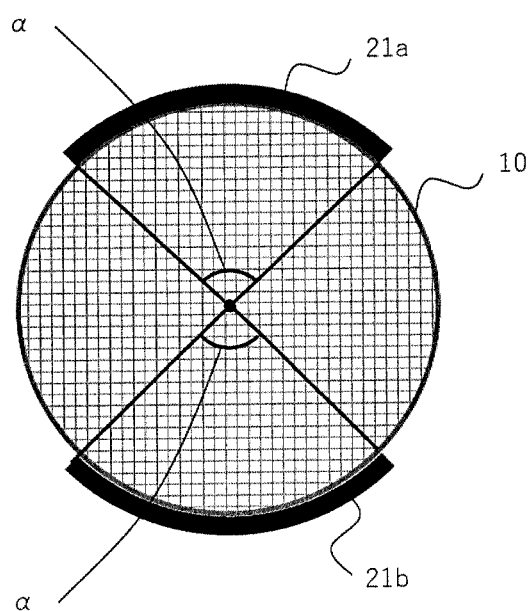
FIG. 6 is a view showing a central angle α of each electrode layer in an embodiment of the present invention.

As used herein, the central angle α refers to an angle formed by straight lines connecting both end portions of the electrode layers 21a, 21b and a center of the honeycomb structure portion, in the cross section orthogonal to the extending direction of the cell 12 (see FIG. 6). In FIG. 6, the central angles α of the pair of electrode layers 21a, 21b are the same.

In the honeycomb structure portion 10 according to the present embodiment, the electric resistivity of the electrode layers 21a, 21b is preferably lower than the electric resistivity of the outer peripheral wall of the honeycomb structure portion 10. Further, the electric resistivity of the electrode layers 21a, 21b is more preferably from 0.1 to 10%, and particularly preferably from 0.5 to 5%, of the electric resistivity of the outer peripheral wall of the honeycomb structure portion 10. If it is lower than 0.1%, an amount of current flowing to the "end portions of the electrode portion" within the electrode layer 21a, 21b will be increased when a voltage is applied to the electrode layers 21a, 21b, so that the current flowing through the honeycomb structure portion 10 may be easily biased. In addition, it may be difficult for the honeycomb structure portion 10 to generate heat uniformly. If it is higher than 10%, an amount of current spreading in the electrode layers 21a, 21b is decreased when a voltage is applied to the electrode layers 21a, 21b, and the current flowing through the honeycomb structure portion 10 may be easily biased. In addition, it may be difficult for the honeycomb structure portion 10 to generate heat uniformly.

Each of the electrode layers 21a, 21b preferably has a thickness of from 0.01 to 5 mm, and more preferably from 0.01 to 3 mm. The thickness in such a range can provide contribution to uniform heat generation of the honeycomb structure portion. If the thickness of each of the electrode layers 21a, 21b is less than 0.01 mm, the electric resistivity will be increased and uniform heat generation may not be possible. If the thickness of each of the electrode layers 21a, 21b is more than 5 mm, breakage may occur during canning.

As shown in FIG. 5, in this embodiment, the end portions of the electrode layers 21a, 21b in the extending direction of the cell 12 are in contact with (reach) the end face 102 of the honeycomb structure portion. Further, a preferable embodiment is also a state where at least one end portion of the end portions of the electrode layers 21a, 21b in the extending direction of the cell 12 is not in contact with (does not reach)

the end face 102 of the honeycomb structure portion 10. This can allow improvement of the thermal shock resistance of the honeycomb structure.

In the honeycomb structure portion 10 of the present embodiment, each of the electrode layers 21a, 21b is formed in a shape such that a planar rectangular member is curved along an outer periphery of a pillar shape, for example as shown in FIG. 4. Here, a shape when the curved electrode layer 21a, 21b is deformed into a non-curved planar member will be referred to as a "planar shape" of the electrode layer 21a, 21b. The "planar shape" of the electrode layer 21a, 21b shown in FIGS. 1 to 3 will be a rectangle. An "outer peripheral shape of the electrode layer" as used herein means "an outer peripheral shape of the planar shape of the electrode portion".

In the honeycomb structure portion 10 according to the present embodiment, the outer peripheral shape of the strip-shaped electrode layer may be a shape in which each of rectangular corner portions is formed in a curved shape. Such a shape allows improvement of the thermal shock resistance of the honeycomb structure. A preferable embodiment is that the outer periphery of each strip-shaped electrode layer 21a, 21b has a shape in which the rectangular corner portions are linearly chamfered. Such a shape can allow improvement of the thermal shock resistance of the honeycomb structure.

EXAMPLES

Hereinafter, Examples is illustrated for better understanding of the present invention and its advantages, but the present invention is not limited to these Examples.

Silicon carbide (SiC) powder and metallic silicon (Si) powder were mixed in a mass ratio of 60:40 to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide powder (SiC) and the metallic silicon (Si) powder was 100 parts by mass. The content of the pore former was 3 parts by mass when the total of the silicon carbide powder (SiC) and the metallic silicon (Si) powder was 100 parts by mass. The content of water was 42 parts by mass when the total of the silicon carbide powder (SiC) and the metallic silicon (Si) powder was 100 parts by mass. The average particle diameter of the silicon carbide powder was 20 μm, and the average particle diameter of the metallic silicon powder was 6 μm. The average particle diameter of the pore former was 20 μm. The average particle diameter of each of the silicon carbide powder, the metallic silicon powder and the pore former refers to an arithmetic mean diameter on volume basis, when measuring frequency distribution of a particle size by the laser diffraction method.

The resulting circular pillar shaped green body was formed using an extruder to obtain a pillar shaped honeycomb formed body in which each cell had a square cross-sectional shape. A predetermined amount of both end faces of the resulting honeycomb formed body was cut.

A plugging treatment was performed by injecting a green body into a plurality of cells on one end face of the resulting honeycomb formed body. The plugging treatment was then performed by injecting a green body into the cells in which the opposite end face was not plugged, on the other end face. The plugged portions were dried with hot air at 200° C. to obtain a honeycomb dried body. The honeycomb dried body was degreased (calcined) and then fired.

Then, to metallic silicon (Si) powder were added hydroxypropyl methyl cellulose as a binder, glycerin as a humectant, a surfactant as a dispersant and water, and mixed together. The mixture was kneaded to prepare an electrode layer-forming raw material. The electrode layer-forming raw material was then applied onto the side surface of the honeycomb fired body, starting from the outflow end portion of the honeycomb fired body, such that a thickness was 1.5 mm. The length L2 of the range where the electrode layer-forming material was applied is shown in Table 1. The electrode layer-forming material was applied to two positions on the side surface of the honeycomb fired body. Then, in the cross section orthogonal to the extending direction of the cell, one of the two portions coated with the electrode layer-forming material was disposed on a side opposite to the other, across the center of the honeycomb fired body.

The electrode layer-forming raw material applied to the honeycomb fired body was then dried to obtain a honeycomb fired body with unfired electrodes. The drying temperature was 70° C.

Subsequently, the honeycomb fired body with unfired electrodes was degreased (calcined), fired and further oxidized to obtain a honeycomb structure with electrodes. The degreasing was carried out at 550° C. for 3 hours. The firing was performed in an Ar atmosphere at 1450° C. for 2 hours. The oxidation was carried out at 1300° C. for 1 hour. Each of the end faces of the resulting honeycomb structure had a circular shape with a diameter of 100 mm, and the length L1 of the honeycomb structure in the extending direction of the cell was 120 mm.

(Evaluation for Temperature Difference)

At a central position in the cross section of each honeycomb structure with electrodes and at a position of 10 mm from the inlet end face were disposed thermocouples (hereinafter referred to as upstream thermocouples). Further, at the central position in the cross section of the honeycomb structure and at a position of 10 mm from the outlet end face were disposed thermocouples (hereinafter referred to as downstream thermocouples). By disposing these thermocouples, the temperature of the honeycomb structure portion can be measured.

The honeycomb structure with electrodes was installed in an exhaust pipe of a gasoline engine with 1.4 liters displacement, and 4 g/liter of particulates was deposited on the honeycomb structure with electrodes. The engine was then stopped and the honeycomb structure was left until the temperature of the exhaust pipe was 25° C. The gasoline engine was then started, and electricity of 3 kW was applied to the honeycomb structure with electrodes for 30 seconds. After stating the engine, it was maintained in an idling state for 600 seconds. During this period of time, a part of the deposited particulates was burned and the temperature of the honeycomb structure portion of the honeycomb structure with electrodes was increased. The temperature of the honeycomb structure portion of the honeycomb structure with electrodes was measured by the upstream thermocouples and the downstream thermocouples as described above.

TABLE 1

| | Honeycomb Structure Portion | | Electrode Layer | | | | Temperature Distribution (° C.) | | Downstream Temp. − Upstream Temp. (° C.) |
| --- | --- | --- | --- | --- | --- | --- | --- | --- | --- |
| | Diameter D (mm) | Length L1 (mm) | Central angle α (°) | Length L2 (mm) | Thickness t (mm) | L2/L1 | Upstream | Downstream | |
| Comparative Example | 100 | 120 | 140 | 120 | 1.0 | 1.0 | 422 | 627 | 205 |
| Example 1 | 100 | 120 | 140 | 108 | 1.0 | 0.9 | 425 | 599 | 174 |
| Example 2 | 100 | 120 | 140 | 80 | 1.0 | 0.67 | 422 | 560 | 138 |
| Example 3 | 100 | 120 | 140 | 40 | 1.0 | 0.33 | 424 | 583 | 159 |
| Example 4 | 100 | 120 | 140 | 30 | 1.0 | 0.25 | 423 | 593 | 170 |

DISCUSSION

According to Table 1, all Examples showed a smaller temperature difference between the upstream portion and the downstream portion of the honeycomb structure portion than that of Comparative Example.

DESCRIPTION OF REFERENCE NUMERALS

10 . . . honeycomb structure portion
101 . . . inflow end face
102 . . . outflow end face
11 . . . partition wall
12 . . . cell
13 . . . plugged portion
21$a$, 21$b$ . . . electrode layer

The invention claimed is:

1. A honeycomb structure, comprising:
a pillar shaped honeycomb structure portion having:
porous partition walls extending through the pillar shaped honeycomb structure portion from an inflow end face to an outflow end face to define a plurality of cells forming a through channel;
an outer peripheral wall located at an outermost periphery;
a pair of electrode layers disposed on a side surface of the pillar shaped honeycomb structure portion;
wherein each of the pair of electrode layers is formed in a strip shape extending in an extending direction of the plurality of cells of the pillar shaped honeycomb structure portion;
wherein one electrode layer of the pair of electrode layers is disposed on a side opposite to the other electrode layer of the pair of electrode layers across a center of the pillar shaped honeycomb structure portion in a cross section orthogonal to the extending direction of the plurality of cells;
wherein the pillar shaped honeycomb structure portion comprises:
a plurality of first cells, the plurality of first cells being opened on the inflow end face and having plugged portions on the outflow end face; and
a plurality of second cells, the plurality of second cells being opened on the outflow end face and having plugged portions on the inflow end face;
wherein a middle position of each length of the pair of electrode layers is closer to the outflow end face than a middle position of a length of the pillar shaped honeycomb structure portion in the extending direction of the plurality of cells,
wherein the pillar shaped honeycomb structure portion includes only the pair of electrode layers, and
wherein each of the pair of electrode layers has a length of less than 0.8×L in the extending direction of the plurality of cells of the pillar shaped honeycomb structure portion from the outflow end face, in which L is the length of the pillar shaped honeycomb structure portion in the extending direction of the plurality of cells.

2. The honeycomb structure according to claim 1, wherein the pillar shaped honeycomb structure portion is formed of a ceramic material.

3. The honeycomb structure according to claim 1, wherein a material of the pillar shaped honeycomb structure portion has a negative temperature coefficient (NTC) characteristic.

* * * * *